United States Patent
Graziosi et al.

(10) Patent No.: US 12,273,545 B2
(45) Date of Patent: Apr. 8, 2025

(54) TASK-DRIVEN MACHINE LEARNING-BASED REPRESENTATION AND COMPRESSION OF POINT CLOUD GEOMETRY

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, Tokyo (JP)

( * ) Notice: Subject to any disclaimer, the term of this patent is extended or adjusted under 35 U.S.C. 154(b) by 219 days.

(21) Appl. No.: 17/828,392

(22) Filed: May 31, 2022

(65) Prior Publication Data
US 2023/0025378 A1   Jan. 26, 2023

Related U.S. Application Data

(60) Provisional application No. 63/221,545, filed on Jul. 14, 2021.

(51) Int. Cl.
*H04N 19/42* (2014.01)
*G06N 3/082* (2023.01)
(Continued)

(52) U.S. Cl.
CPC ............. *H04N 19/42* (2014.11); *G06N 3/082* (2013.01); *G06V 10/764* (2022.01); *G06V 10/82* (2022.01); *H04N 19/597* (2014.11)

(58) Field of Classification Search
CPC ....... H04N 19/42; G06V 10/82; G06V 10/764
(Continued)

(56) References Cited

U.S. PATENT DOCUMENTS 8,126,276 B2   2/2012 Bolle
2018/0332138 A1*  11/2018 Liu .................... H04L 41/5041
(Continued)

FOREIGN PATENT DOCUMENTS

CN      111932690 A    11/2020
WO      2021036550 A1   3/2021

OTHER PUBLICATIONS

Julien N P Martel et al: "ACORN: Adaptive Coordinate Networks for Neural Scene Representation", arxiv.org, Cornell University Library, 201 Olin Library Cornell University Ithaca, NY 14853, May 6, 2021 (May 6, 2021), XP081959157, abstract Chapters 1-8; p. 1-p. 11; figures 1-6; tables 1-6.
(Continued)

*Primary Examiner* — Jeffery A Williams
(74) *Attorney, Agent, or Firm* — Haverstock & Owens, A Law Corporation

(57) ABSTRACT

Methods, systems and devices described herein implement a task-driven machine learning-based compression scheme for point cloud geometry implicit representation. The machine learning-based codec is able to be optimized for a task to achieve better compression rates by being conditioned to what the reconstructed signal will be used for. The latent representation of the point cloud or the neural network that implicitly represents the point cloud itself are able to be compressed. The methods described herein perform efficient compression of the implicit representation of a point cloud given a target task.

27 Claims, 3 Drawing Sheets

(51) Int. Cl.
*G06V 10/764* (2022.01)
*G06V 10/82* (2022.01)
*H04N 19/597* (2014.01)

(58) Field of Classification Search
USPC .................................................. 375/240.08
See application file for complete search history.

(56) References Cited

U.S. PATENT DOCUMENTS

| | | | |
|---|---|---|---|
| 2020/0016756 A1* | 1/2020 | Rus | B25J 9/161 |
| 2020/0120347 A1* | 4/2020 | Boyce | H04N 19/42 |
| 2020/0364574 A1* | 11/2020 | Kim | G06N 3/045 |
| 2022/0005212 A1* | 1/2022 | Nagano | G06V 10/82 |
| 2023/0005217 A1* | 1/2023 | Chen | G06N 20/00 |

OTHER PUBLICATIONS

Mescheder Lars et al: "Occupancy Networks: Learning 3D Reconstruction in Function Space", 2019 IEEE/CVF Conference on Computer Vision and Pattern Recognition (CVPR ), IEEE, Jun. 15, 2019 (Jun. 15, 2019), pp. 445-4465, XP033686741, DOI: 10.1109/CVPR.2019.00459 [retrieved on Jan. 8, 2020] abstract Chapters 1-5; p. 4455-p. 4462; figures 1-7; tables 1-4.

The International Search Report with Written Opinion dated Oct. 24, 2022, for PCT Application No. PCT/IB2022/056478.

Evangelos Alexiou, Kuan Tung, and Touradj Ebrahimi, "Towards neural network approaches for point cloud compression", Proc. SPIE 11510, Applications of Digital Image Processing XLIII, 1151008 (Aug. 21, 2020); https://doi.org/10.1117/12.2569115.

Kent Fujiwara, Taiichi Hashimoto, Neural Implicit Embedding for Point Cloud Analysis, CVPR 2020, paper is the Open Access version, provided by the Computer Vision Foundation, Jun. 2020, pp. 11734-11743, Line Corporation.

* cited by examiner

TASK-DRIVEN MACHINE LEARNING-BASED REPRESENTATION AND COMPRESSION OF POINT CLOUD GEOMETRY

CROSS-REFERENCE TO RELATED APPLICATION(S)

This application claims priority under 35 U.S.C. § 119(e) of the U.S. Provisional Patent Application Ser. No. 63/221,545, filed Jul. 14, 2021 and titled, "TASK-DRIVEN MACHINE LEARNING-BASED REPRESENTATION AND COMPRESSION OF POINT CLOUD GEOMETRY," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, point clouds have been considered as a candidate format for transmission of 3D data, either captured by 3D scanners, LIDAR sensors, or used in popular applications such as VR/AR. Point clouds are a set of points in 3D space.

Besides the spatial position (x, y, z), each point usually have associated attributes, such as color (R, G, B) or even reflectance and temporal timestamps (e.g., in LIDAR images).

In order to obtain a high fidelity representation of the target 3D objects, devices capture point clouds in the order of thousands or even millions of points.

Moreover, for dynamic 3D scenes used in VR/AR application, every single frame often has a unique dense point cloud, which result in the transmission of several millions of point clouds per second. For a viable transmission of such large amount of data compression is often applied.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding.

With the conclusion of G-PCC and V-PCC activities, the MPEG PCC working group started to explore other compression paradigms, which included machine learning-based point cloud compression.

Occupancy networks implicitly represent the 3D surface as the continuous decision boundary of a deep neural network classifier. The representation encodes a description of the 3D output at infinite resolution.

More recently, spatially sparse convolution neural networks were applied to lossless and lossy geometry compression, with additional scalable coding capability.

SUMMARY OF THE INVENTION

Methods, systems and devices described herein implement a task-driven machine learning-based compression scheme for point cloud geometry implicit representation. The machine learning-based codec is able to be optimized for a task to achieve better compression rates by being conditioned to what the reconstructed signal will be used for. The latent representation of the point cloud or the neural network that implicitly represents the point cloud itself are able to be compressed. The methods described herein perform efficient compression of the implicit representation of a point cloud given a target task.

In one aspect, a method programmed in a non-transitory memory of a device comprises determining a task, receiving a point cloud, adjusting a neural network based on the task, training the neural network with the point cloud, compressing the neural network and sending the compressed neural network. The task input by a user or generated by a computing device based on other data. Receiving the point cloud includes acquired the point cloud with a camera or camera system or receiving the point cloud via download. Adjusting the neural network includes machine learning based on training for the task. Adjusting the neural network is based on a difficulty of compressing the neural network. The neural network is initially adjusted with training data for the task, and then the point cloud is used for further training. The neural network implements one or more occupancy networks. The neural network is represented by an implicit function. Compressing the neural network includes defining a function. Sending the compressed neural network includes sending a capability of representing a class of input point clouds.

In another aspect, an apparatus comprises a non-transitory memory for storing an application, the application for: determining a task, receiving a point cloud, adjusting a neural network based on the task, training the neural network with the point cloud, compressing the neural network and sending the compressed neural network and a processor coupled to the memory, the processor configured for processing the application. The task input by a user or generated by a computing device based on other data. Receiving the point cloud includes acquired the point cloud with a camera or camera system or receiving the point cloud via download. Adjusting the neural network includes machine learning based on training for the task. Adjusting the neural network is based on a difficulty of compressing the neural network. The neural network is initially adjusted with training data for the task, and then the point cloud is used for further training. The neural network implements one or more occupancy networks. The neural network is represented by an implicit function. Compressing the neural network includes defining a function. Sending the compressed neural network includes sending a capability of representing a class of input point clouds.

In another aspect, a system comprises an encoder configured for: determining a task, receiving a point cloud, adjusting a neural network based on the task, training the neural network with the point cloud, compressing the neural network and sending the compressed neural network and a decoder configured for decoding the compressed neural network. The task input by a user or generated by a computing device based on other data. Receiving the point cloud includes acquired the point cloud with a camera or camera system or receiving the point cloud via download. Adjusting the neural network includes machine learning based on training for the task. Adjusting the neural network is based on a difficulty of compressing the neural network. The neural network is initially adjusted with training data for the task, and then the point cloud is used for further training. The neural network implements one or more occupancy networks. The neural network is represented by an implicit function. Compressing the neural network includes defining a function. Sending the compressed neural network includes sending a capability of representing a class of input point clouds.

DETAILED DESCRIPTION OF THE PREFERRED EMBODIMENT

Methods, systems and devices described herein implement a task-driven machine learning-based compression scheme for point cloud geometry implicit representation.

If one has a specific task as a target (related to computer and/or human vision), the machine learning-based codec is able to be optimized to achieve better compression rates by being conditioned to what the reconstructed signal will be used for. Furthermore, one could opt to compress the latent representation of the point cloud or the neural network that implicitly represents the point cloud itself. The methods described herein perform efficient compression of the implicit representation of a point cloud given a target task.

Compression 3D scenes are typically based on separate compression and rendering steps.

The Moving Picture Experts Group (MPEG) is currently concluding two standards for Point Cloud Compression (PCC). Point clouds are used to represent three-dimensional scenes and objects, and are composed by volumetric elements (voxels) described by their position in 3D space and attributes such as color, reflectance, material, and transparency. The planned outcome of the standardization activity is the Geometry-based Point Cloud Compression (G-PCC) and the Video-based Point Cloud Compression (V-PCC). More recently, machine learning-based point cloud compression architectures are being studied.

An end-to-end machine learning-based function design that combines both, point cloud geometry compression as well as a specific computer vision task, such as semantic segmentation, object detection and others, is described herein. The implementations have a hybrid operation mode where the end-to-end design of the function combines not only compression with a computer vision task, but also human vision (e.g., rendering).

Figure 1:
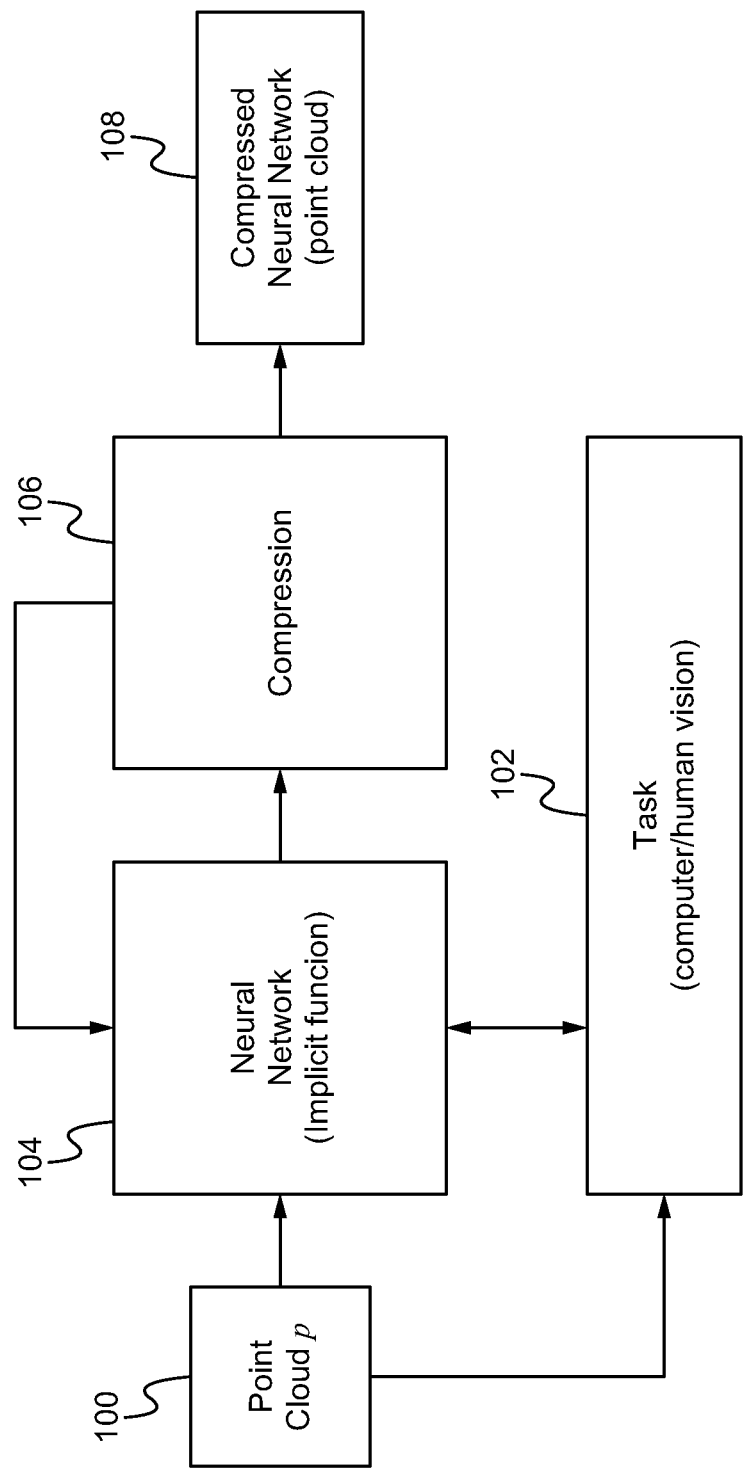
FIG. 1 illustrates a diagram of a diagram of a method of task-driven machine learning-based implicit representation and compression of point clouds according to some embodiments.

FIG. 1 illustrates a diagram of a diagram of a method of task-driven machine learning-based implicit representation and compression of point clouds according to some embodiments. Given a specific task, a point cloud is able to be implicitly represented using a machine learning-based approach and optimize compression of the network. A point cloud p 100 will be used for a specific task 102 (e.g., 3D biometry, classification, segmentation or 3D video/image visualization). The task 102 is the defined goal. Based on the task 102, the neural network (implicit function) 104 is adjusted. The neural network 104 is also trained based on the task for some classes of input point clouds. The neural network 104 is able to implement occupancy networks or another network with different features or characteristics. The neural network 104 is compressed using compression 106. The compressed neural network 108 is sent with its capability of representing a class of input point clouds.

The compression is done on the weights of the neural networks. Network architecture parameters are sent to the decoder. When designing the function or estimating parameters of the network, the task of machine learning or human vision (rendering) is included.

Figure 2:
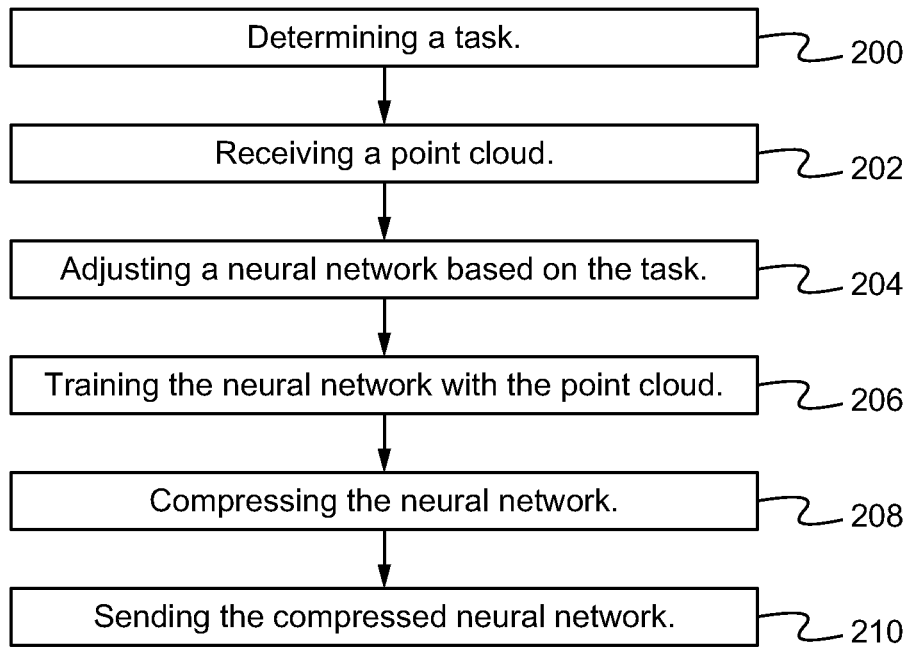
FIG. 2 illustrates a flowchart of a method of implementing task-driven machine learning-based implicit representation and compression according to some embodiments.

FIG. 2 illustrates a flowchart of a method of implementing task-driven machine learning-based implicit representation and compression according to some embodiments. In the step 200, a task is determined or defined. The task is able to be input by a user or generated by a computing device based on other data. For example, based on the acquired data and/or a previous task, the device is able to determine the current task. In the step 202, a point cloud is received. The point cloud is able to be acquired in any manner such as using a camera or camera system or receiving a point cloud such as via download. In some embodiments, the input received includes points, voxels, meshes, or projected images of 3D objects. In the step 204, a neural network is adjusted/tuned based on the task. For example, specific variables are able to be given more weight than others depending on the determined task. The adjusting is able to include machine learning based on training specifically for the task or in any other manner. In some embodiments, the neural network is adjusted based on the difficulty of compressing the network. In the step 206, the adjusted neural network is trained with the point cloud. For example, the neural network is initially adjusted with training data for a specific task, and then a received point cloud p is used for further training. The neural network is able to implement occupancy networks or another network with different features or characteristics. In the step 208, the neural network is compressed. In some embodiments, the compression of the neural network involves defining a function (e.g., implicit function representation) and/or the point cloud as a function. For example, the neural network is represented by an implicit function (y=f(x)). Furthering the example, the function is able to indicate the probability of a point being occupied or not. Aspects of the compression method described in U.S. patent application Ser. No. 17/828,326, filed May 31, 2022, titled "POINT CLOUD COMPRESSION USING OCCUPANCY NETWORKS," are incorporated by reference in its entirety for all purposes. In some embodiments, compression and rendering are performed together. In the step 210, the compressed neural network (e.g., the function) is sent (e.g., to a decoder) with its capability of representing a class (or different classes) of input point clouds. It is not only the compression of a signal, it is the compression of the signal while considering the task to be performed. In some embodiments, fewer or additional steps are implemented. In some embodiments, the order of the steps is modified.

Figure 3:
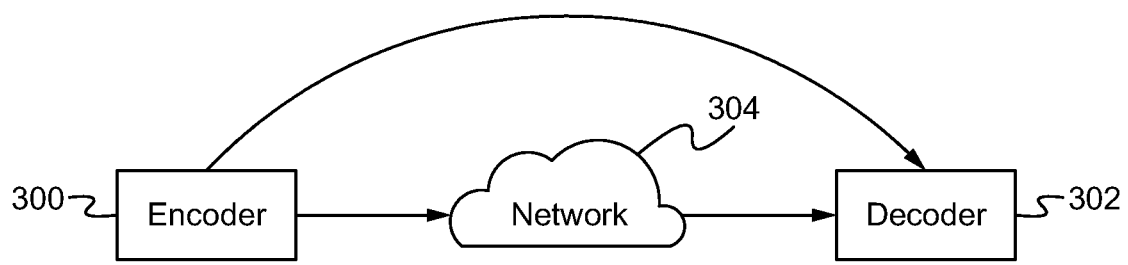
FIG. 3 illustrates a diagram of a network of devices configured to implement the method of implementing task-driven machine learning-based implicit representation and compression according to some embodiments.

FIG. 3 illustrates a diagram of a network of devices configured to implement the method of implementing task-driven machine learning-based implicit representation and compression according to some embodiments. An encoder 300 is configured to implement the task-driven machine learning-based implicit representation and compression of a point cloud or other data. The encoder 300 communicates the encoded information to a decoder 302. The decoder 302 is configured to decode the encoded information. In some embodiments, the decoder 302 communicates the decoded information to a display component. The encoder 300 is able to communicate the encoded information to the decoder 302 over a network 304. The network 304 is able to be any network such as the Internet or a Local Area Network (LAN). In some embodiments, the encoder 300 and decoder 302 are able to communicate directly (e.g., without a network). In some embodiments, the encoder 300 and the decoder 302 are on/in the same device.

Figure 4:
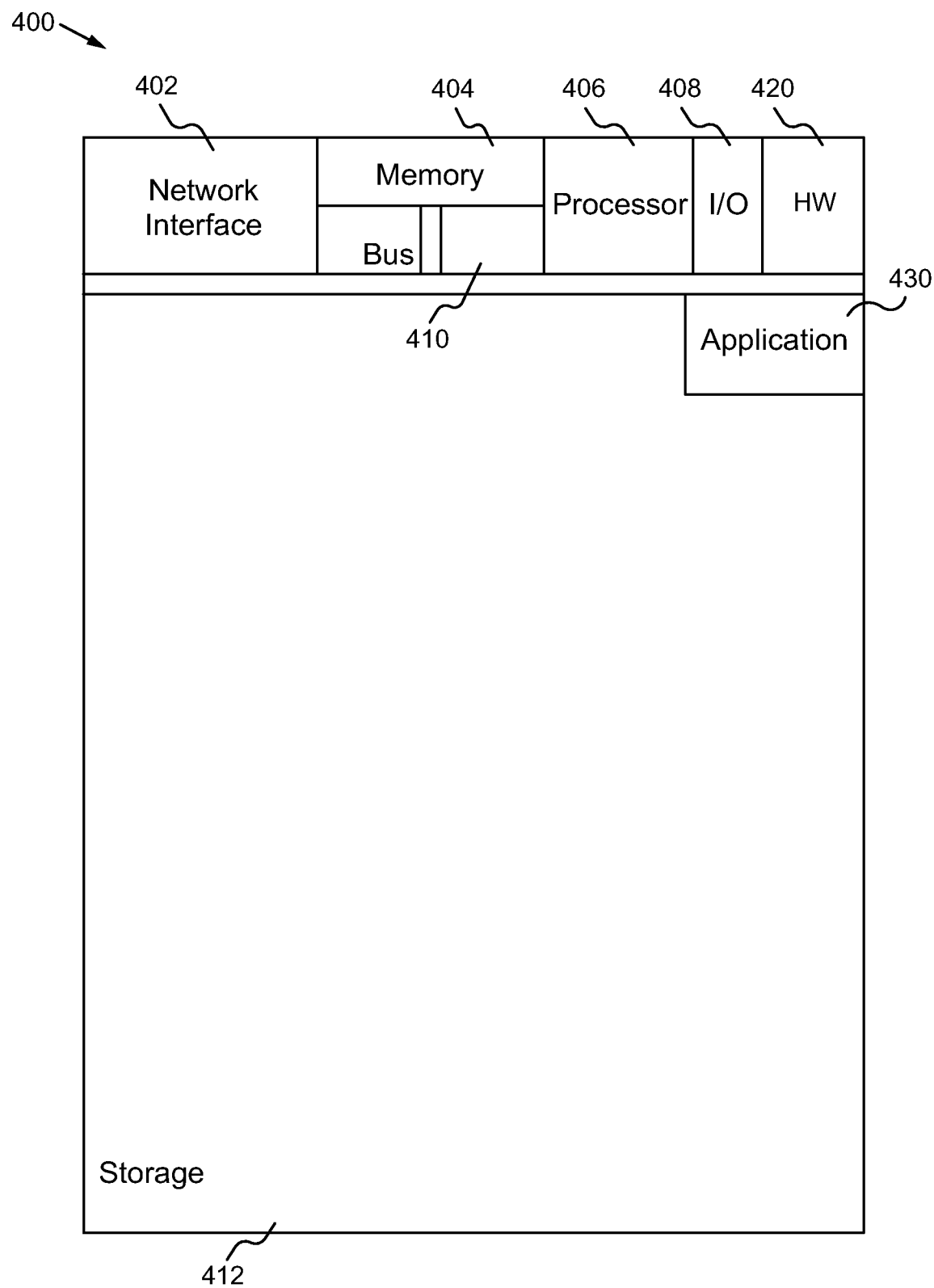
FIG. 4 illustrates a block diagram of an exemplary computing device configured to implement the method of implementing task-driven machine learning-based implicit representation and compression according to some embodiments.

FIG. 4 illustrates a block diagram of an exemplary computing device configured to implement the method of implementing task-driven machine learning-based implicit representation and compression according to some embodiments. The computing device 400 is able to be used to acquire, store, compute, process, communicate and/or display information such as images and videos including 3D content. The computing device 400 is able to implement any of the encoding/decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Implicit representation and compression application(s) 430 used to implement the implicit representation and compression implementation are likely to be stored in the storage device 412 and memory 404 and processed as applications are typically processed. More or fewer components shown in FIG. 4 are able to be included in the computing device 400. In some embodiments, implicit representation and compression hardware 420 is included. Although the computing device 400 in FIG. 4 includes applications 430 and hardware 420 for the implicit representation and compression method, the implicit representation and compression method is able to be implemented on a computing device in hardware, firmware, software or any combination thereof. For example, in some embodiments, the implicit representation and compression applications 430 are programmed in a memory and executed using a processor. In another example, in some embodiments, the implicit representation and compression hardware 420 is programmed hardware logic including gates specifically designed to implement the implicit representation and compression method.

In some embodiments, the implicit representation and compression application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the compression method, a device acquires or receives 3D content (e.g., point cloud content). The compression method is able to be implemented with user assistance or automatically without user involvement.

In operation, the compression method implements an end-to-end machine learning-based function design that combines both, point cloud geometry compression as well as a specific computer vision task such as semantic segmentation, object detection and others. The compression method is extended to a hybrid operation mode where the end-to-end deign of the function combines not only compression aiming computer vision tasks, but also human vision (e.g., rendering).

Some Embodiments of Task-Driven Machine Learning-Based Representation and Compression of Point Cloud Geometry 1. A method programmed in a non-transitory memory of a device comprising:
   determining a task;
   receiving a point cloud;
   adjusting a neural network based on the task;
   training the neural network with the point cloud;
   compressing the neural network; and
   sending the compressed neural network.
2. The method of clause 1 wherein the task input by a user or generated by a computing device based on other data.
3. The method of clause 1 wherein receiving the point cloud includes acquired the point cloud with a camera or camera system or receiving the point cloud via download.
4. The method of clause 1 wherein adjusting the neural network includes machine learning based on training for the task.
5. The method of clause 1 wherein adjusting the neural network is based on a difficulty of compressing the neural network.
6. The method of clause 1 wherein the neural network is initially adjusted with training data for the task, and then the point cloud is used for further training.
7. The method of clause 1 wherein the neural network implements one or more occupancy networks.
8. The method of clause 1 wherein the neural network is represented by an implicit function.
9. The method of clause 1 wherein compressing the neural network includes defining a function.
10. The method of clause 1 wherein sending the compressed neural network includes sending a capability of representing a class of input point clouds.
11. An apparatus comprising:
    a non-transitory memory for storing an application, the application for:
      determining a task;
      receiving a point cloud;
      adjusting a neural network based on the task;
      training the neural network with the point cloud;
      compressing the neural network; and
      sending the compressed neural network; and
    a processor coupled to the memory, the processor configured for processing the application.

12. The apparatus of clause 11 wherein the task input by a user or generated by a computing device based on other data.
13. The apparatus of clause 11 wherein receiving the point cloud includes acquired the point cloud with a camera or camera system or receiving the point cloud via download.
14. The apparatus of clause 11 wherein adjusting the neural network includes machine learning based on training for the task.
15. The apparatus of clause 11 wherein adjusting the neural network is based on a difficulty of compressing the neural network.
16. The apparatus of clause 11 wherein the neural network is initially adjusted with training data for the task, and then the point cloud is used for further training.
17. The apparatus of clause 11 wherein the neural network implements one or more occupancy networks.
18. The apparatus of clause 11 wherein the neural network is represented by an implicit function.
19. The apparatus of clause 11 wherein compressing the neural network includes defining a function.
20. The apparatus of clause 11 wherein sending the compressed neural network includes sending a capability of representing a class of input point clouds.
21. A system comprising:
    an encoder configured for:
        determining a task;
        receiving a point cloud;
        adjusting a neural network based on the task;
        training the neural network with the point cloud;
        compressing the neural network; and
        sending the compressed neural network; and
    a decoder configured for:
        decoding the compressed neural network.
22. The system of clause 21 wherein the task input by a user or generated by a computing device based on other data.
23. The system of clause 21 wherein receiving the point cloud includes acquired the point cloud with a camera or camera system or receiving the point cloud via download.
24. The system of clause 21 wherein adjusting the neural network includes machine learning based on training for the task.
25. The system of clause 21 wherein adjusting the neural network is based on a difficulty of compressing the neural network.
26. The system of clause 21 wherein the neural network is initially adjusted with training data for the task, and then the point cloud is used for further training.
27. The system of clause 21 wherein the neural network implements one or more occupancy networks.
28. The system of clause 21 wherein the neural network is represented by an implicit function.
29. The system of clause 21 wherein compressing the neural network includes defining a function.
30. The system of clause 21 wherein sending the compressed neural network includes sending a capability of representing a class of input point clouds.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
    determining a task;
    receiving a point cloud;
    adjusting a neural network based on the task, including weighting specific variables depending on the task;
    training the neural network with the point cloud;
    compressing the neural network, including defining a function to indicate a probability of a point being occupied; and
    sending the compressed neural network.
2. The method of claim 1 wherein the task input by a user or generated by a computing device based on other data.
3. The method of claim 1 wherein receiving the point cloud includes acquiring the point cloud with a camera or camera system or receiving the point cloud via download.
4. The method of claim 1 wherein adjusting the neural network includes machine learning based on training for the task.
5. The method of claim 1 wherein adjusting the neural network is based on a difficulty of compressing the neural network.
6. The method of claim 1 wherein the neural network is initially adjusted with training data for the task, and then the point cloud is used for further training.
7. The method of claim 1 wherein the neural network implements one or more occupancy networks.
8. The method of claim 1 wherein the neural network is represented by an implicit function.
9. The method of claim 1 wherein sending the compressed neural network includes sending a representation of a class of input point clouds.
10. An apparatus comprising:
    a non-transitory memory for storing an application, the application for:
        determining a task;
        receiving a point cloud;
        adjusting a neural network based on the task, including weighting specific variables depending on the task;
        training the neural network with the point cloud;
        compressing the neural network, including defining a function to indicate a probability of a point being occupied; and
        sending the compressed neural network; and
    a processor coupled to the memory, the processor configured for processing the application.
11. The apparatus of claim 10 wherein the task input by a user or generated by a computing device based on other data.
12. The apparatus of claim 10 wherein receiving the point cloud includes acquiring the point cloud with a camera or camera system or receiving the point cloud via download.
13. The apparatus of claim 10 wherein adjusting the neural network includes machine learning based on training for the task.
14. The apparatus of claim 10 wherein adjusting the neural network is based on a difficulty of compressing the neural network.
15. The apparatus of claim 10 wherein the neural network is initially adjusted with training data for the task, and then the point cloud is used for further training.
16. The apparatus of claim 10 wherein the neural network implements one or more occupancy networks.

17. The apparatus of claim 10 wherein the neural network is represented by an implicit function.

18. The apparatus of claim 10 wherein sending the compressed neural network includes sending a representation of a class of input point clouds.

19. A system comprising:
an encoder configured for:
  determining a task;
  receiving a point cloud;
  adjusting a neural network based on the task, including weighting specific variables depending on the task;
  training the neural network with the point cloud;
  compressing the neural network, including defining a function to indicate a probability of a point being occupied; and
  sending the compressed neural network; and
a decoder configured for:
  decoding the compressed neural network.

20. The system of claim 19 wherein the task input by a user or generated by a computing device based on other data.

21. The system of claim 19 wherein receiving the point cloud includes acquiring the point cloud with a camera or camera system or receiving the point cloud via download.

22. The system of claim 19 wherein adjusting the neural network includes machine learning based on training for the task.

23. The system of claim 19 wherein adjusting the neural network is based on a difficulty of compressing the neural network.

24. The system of claim 19 wherein the neural network is initially adjusted with training data for the task, and then the point cloud is used for further training.

25. The system of claim 19 wherein the neural network implements one or more occupancy networks.

26. The system of claim 19 wherein the neural network is represented by an implicit function.

27. The system of claim 19 wherein sending the compressed neural network includes sending a representation of a class of input point clouds.

* * * * *